US009705299B1

(12) United States Patent
Maurer et al.

(10) Patent No.: US 9,705,299 B1
(45) Date of Patent: Jul. 11, 2017

(54) ELECTRICAL BUSWAY JOINT WITH EXTERNAL VISE BRACES

(71) Applicant: General Electric Company, Schenectady, NY (US)

(72) Inventors: William Patrick Maurer, West Hartford, CT (US); Vu Dinh Nguyen, West Hartford, CT (US); Deniz Semih Gifford, New Britain, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/990,037

(22) Filed: Jan. 7, 2016

(51) Int. Cl.
*H01R 4/60* (2006.01)
*H02G 5/00* (2006.01)

(52) U.S. Cl.
CPC .................................. *H02G 5/007* (2013.01)

(58) Field of Classification Search
CPC .... H01R 25/14; H01R 25/145; H01R 25/162; H02G 5/007
USPC ................................ 439/213, 251; 174/88 B
See application file for complete search history.

(56) References Cited

U.S. PATENT DOCUMENTS

| | | | |
|---|---|---|---|
| 2,868,864 | A | 1/1959 | Page |
| 3,004,096 | A | 10/1961 | Rowe |
| 3,031,521 | A | 4/1962 | Paul et al. |
| 3,088,994 | A | 5/1963 | Cataldo |
| 3,462,541 | A * | 8/1969 | Wescott ................. H02G 5/007 174/88 B |
| 3,559,148 | A | 1/1971 | Hafer |
| 3,786,394 | A | 1/1974 | Koenig et al. |
| 4,008,366 | A | 2/1977 | Geyer |
| 4,199,655 | A | 4/1980 | Shariff et al. |
| 4,552,135 | A | 11/1985 | Racz et al. |
| 4,728,752 | A | 3/1988 | Hicks, Jr. |
| 4,842,533 | A | 6/1989 | Beberman et al. |

(Continued)

FOREIGN PATENT DOCUMENTS

| | | |
|---|---|---|
| CA | 2087764 A1 | 8/1993 |
| CA | 2253391 A1 | 5/1999 |

(Continued)

OTHER PUBLICATIONS

Unofficial English translation of Office Action issued in connection with related CN Application No. 201210580764.3 on Jul. 1, 2016.

(Continued)

*Primary Examiner* — Abdullah Riyami
*Assistant Examiner* — Thang Nguyen
(74) *Attorney, Agent, or Firm* — General Electric Company

(57) ABSTRACT

A busway system is provided. The busway system includes a first electrical busway section, a second electrical busway section, and a busway joint. The first and second electrical busway sections are disposed longitudinally offset from each other. The busway joint couples the first and second busway sections. The busway joint includes a plurality of busbars, a plurality of splice plates coupled to the busbars, and a vise brace surrounding the busbars and the splice plates. The splice plates and the busbars electrically couple the first and second electrical busway sections. The vise brace includes a clamp screw to selectively provide a compressive force to the busbars and the splice plates.

16 Claims, 13 Drawing Sheets

(56) References Cited

U.S. PATENT DOCUMENTS

| | | | |
|---|---|---|---|
| 4,849,581 A | 7/1989 | Larkin et al. | |
| 4,950,841 A | 8/1990 | Walker et al. | |
| 5,442,135 A | 8/1995 | Faulkner et al. | |
| 5,466,889 A | 11/1995 | Faulkner et al. | |
| 5,738,779 A | 4/1998 | Dach et al. | |
| 5,760,339 A | 6/1998 | Faulkner et al. | |
| 5,783,779 A | 7/1998 | Graham et al. | |
| 5,785,542 A * | 7/1998 | Johnson | H01R 25/162 439/210 |
| 5,789,709 A | 8/1998 | Luers et al. | |
| 5,821,464 A * | 10/1998 | Graham | H02G 5/06 174/86 |
| 5,854,445 A * | 12/1998 | Graham | H02G 5/007 174/133 B |
| 6,132,859 A | 10/2000 | Jolly | |
| 6,146,169 A | 11/2000 | Calder et al. | |
| 6,435,888 B1 * | 8/2002 | Reed, Jr. | H01R 4/30 174/88 B |
| 6,781,818 B2 | 8/2004 | Josten et al. | |
| 7,091,417 B1 | 8/2006 | Jur et al. | |
| 7,557,298 B2 | 7/2009 | Vanhoutte et al. | |
| 7,718,895 B2 | 5/2010 | Rodriguez | |
| 8,033,850 B2 | 10/2011 | O'Leary et al. | |
| 8,289,680 B2 | 10/2012 | Keegan et al. | |
| 8,333,620 B2 | 12/2012 | Komatsu | |
| 8,436,244 B2 | 5/2013 | Takahashi | |
| 8,540,526 B2 | 9/2013 | Mooney et al. | |
| 8,662,940 B2 | 3/2014 | Decuyper et al. | |
| 8,669,472 B2 | 3/2014 | Plummer et al. | |
| 8,900,002 B2 * | 12/2014 | Mooney | H01R 4/60 439/212 |
| 9,590,406 B1 * | 3/2017 | Maurer | H01R 25/145 |
| 2008/0105451 A1 * | 5/2008 | Rodriguez | H02G 5/007 174/86 |
| 2013/0171849 A1 * | 7/2013 | Mooney | H01R 4/60 439/213 |

FOREIGN PATENT DOCUMENTS

| | | |
|---|---|---|
| CN | 101465529 A | 6/2009 |
| CN | 201303237 Y | 9/2009 |
| CN | 201562757 U | 8/2010 |
| CN | 101895075 A | 11/2010 |
| CN | 201758188 U | 3/2011 |
| DE | 102009032619 A1 | 1/2011 |
| DE | 102010032383 A1 | 2/2012 |
| EP | 0933855 A1 | 8/1999 |
| WO | 2011067647 A2 | 6/2011 |

OTHER PUBLICATIONS

DBTS Industries "Medium Voltage Busbar Trunking Systems Busway 'Cr'", DBTS Industries SON. BHD.,Product Catalog, pp. 1-2.
Eaton Corporation "Pow-R-Way III Low Voltage Busway", Eaton Corp, Cutler-Hammer, Product Catalog, pp. 1-12.
"Spectra Series™ Plug-In and Feeder Busway, GEH-5876 Installation Instructions", GE Electrical Distribution & Control, p. 2 of 8, 1991.
"Spectra Series™ Busway, GE Energy Industrial Solutions", pp. 1-42, 2010.
"Busway Systems, Square D Schneider Electric", pp. 10 and 89 of 152, 2012.
Notice of Allowance issued in connection with related U.S. Appl. No. 13/338,469 on Apr. 19, 2013.
European Search Report and Opinion issued in connection with related EP Application No. 12197438.0 on May 27, 2013.
European Search Report and Opinion issued in connection with related EP Application No. 12197434.9 on May 31, 2013.
Unofficial English Translation of Chinese Office Action issued in connection with related CN Application No. 201210580764.3 on Mar. 14, 2016.
Unofficial English Translation of Chinese Office Action issued in connection with related CN Application No. 2012105828283.3 on Apr. 21, 2016.
Mooney et al., filed Dec. 28, 2011, U.S. Appl. No. 13/338,465.
Maurer et al., filed Jan. 7, 2016, U.S. Appl. No. 14/990,093.
Mooney et al., filed Dec. 28, 2011, U.S. Appl. No. 13/338,469.
Maurer et al., filed Jan. 7, 2016, U.S. Appl. No. 14/990,024.
Maurer et al., filed Jan. 7, 2016, U.S. Appl. No. 14/990,053.
Maurer et al., filed Jan. 7, 2016, U.S. Appl. No. 14/990,077.

* cited by examiner

ELECTRICAL BUSWAY JOINT WITH EXTERNAL VISE BRACES

BACKGROUND

The field of the invention relates generally to an electrical busway, and, more particularly, to a variable length busway joint with external vise braces joining electrical busway sections.

Elongated rectangular flat conductive busbar members are conventionally insulatively arranged within electrical busway sections for transporting multi-phase high current electric power through industrial, commercial, and/or residential establishments. Successive elongated busway sections are electrically connected or interlocked together in end-to-end relation to provide electrical continuity between a power source and a power consuming load.

When longitudinally aligned busway sections are electrically interconnected in a conventional installation, a self-contained busway joint is typically employed. To preserve the thermal properties of the individual busway sections, the busway joint is conventionally constructed with electrically conductive splice plates and interleaving insulative plates fixedly held together by electrically insulated bolts.

Busway sections are generally manufactured and distributed in the form of pre-manufactured fixed-length sections, so that a number of such electrical busway joints are used to install an extended length busway run in an industrial facility. A busway joint enables two fixed-length busway sections to electrically connect at a distance different than the fixed length of the busway sections.

In many cases, the fixed-length sections do not match the specific length required for a given installation. As a result, custom length busway joints may be manufactured, adding significant cost and time to the installation. For example, installers typically order non-standard or custom length busway sections or joints to complete an installation. The custom length busway sections typically are manufactured to a specified length and the installer has to wait until it is delivered to finish installation of the busway run.

It would be desirable to provide a busway joint or busway section having an adjustable length to cooperate with adjacent longitudinally aligned busway sections to eliminate the need for custom length busway sections. Additionally it would be desirable to provide an adjustable length busway joint that permits replacement of a single busway section in a run without the need to remove other abutting busway sections from the end-to-end relationship. It would also be desirable to provide a longitudinally adjustable busway joint.

BRIEF DESCRIPTION

In one aspect, a busway system is provided. The busway system includes a first electrical busway section, a second electrical busway section, and a busway joint. The first and second electrical busway sections are disposed longitudinally offset from each other. The busway joint couples the first and second busway sections. The busway joint includes a plurality of busbars, a plurality of splice plates coupled to the busbars, and a vise brace surrounding the busbars and the splice plates. The splice plates and the busbars electrically couple the first and second electrical busway sections. The vise brace includes a clamp screw to selectively provide a compressive force to the busbars and the splice plates.

In another aspect, a busway joint coupling a first busway section and a second busway section is provided. The busway joint includes a plurality of busbars, a plurality of splice plates coupled to the busbars, and a vise brace externally coupled to the busbars and the splice plates. The splice plates and the busbars electrically couple the first and the second busway sections. The vise brace includes a clamp screw to selectively provide a compressive force to the busbars and the splice plates.

In yet another aspect, a method for assembling a busway system that includes a first busway section, a second busway section disposed longitudinally offset from the first busway section, and a busway joint is provided. The busway joint includes a plurality of busbars and a vise brace surrounding the busbars. The method includes coupling the first busway section to a first end of the busway joint, adjusting a length of the busway joint, coupling the second busway section to a second end of the busway joint, and adjusting a clamp screw of the vise brace to selectively provide a compressive force to the plurality of busbars.

DETAILED DESCRIPTION

As used in this description and in the claims which follow, the term "phase" shall be taken to include all conductors in different runs of any particular busway, bus duct, or busway joint which carry the same electrical phase, and including those conductors which are used to carry any neutral or ground phase.

Various embodiments disclosed herein provide adjustable busway joints for busway systems. As used herein, a "busway joint" refers to a portion of a busway system (e.g., a joint, section, fitting, etc.) that is selectively extended and collapsed to fit between two or more portions of the busway system. For example, the busway joint may be coupled between two sections of the busway system. In another example, the busway joint may be coupled between a joint such as an elbow joint and a section of the busway system. The busway joints are installed and secured in place to prevent the busway joint from moving. The embodiments also describe techniques for securing internal conductors while maintaining electrical connection, such as using a compressive force.

Figure 1:
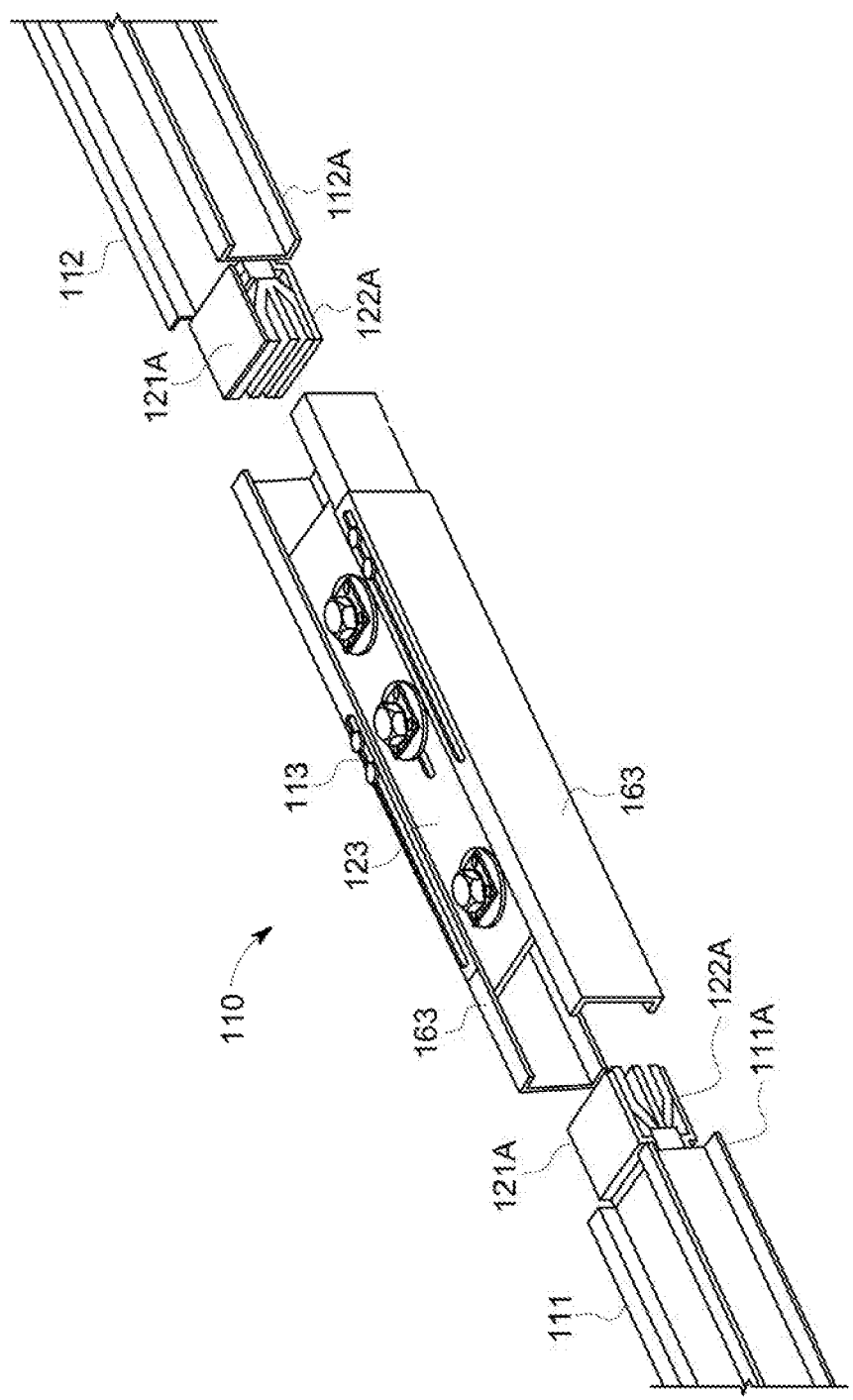
FIG. 1 is a perspective view of an example busway system in an unconnected state according to one embodiment.

According to an example embodiment, as shown in FIG. 1, a busway system 110 includes an elongate first busway section 111, and an elongate second busway section 112 joinable in a substantially longitudinally aligned, end-to-end relationship between an electric power source (not shown) and a load (not shown) via a separate removable and longitudinally adjustable busway joint 113. Busway joint 113 is shown as an example and may be replaced with the busway joints described herein. In one embodiment, busway system 110 is configured to connect to a conventional 3-phase electrical distribution system (not shown). In other embodiments, busway system 110 may be configured to connect with an electrical distribution system having any number of AC electrical phases. In still other embodiments, busway system 110 may be configured to connect with a DC electrical distribution system.

Figure 2:
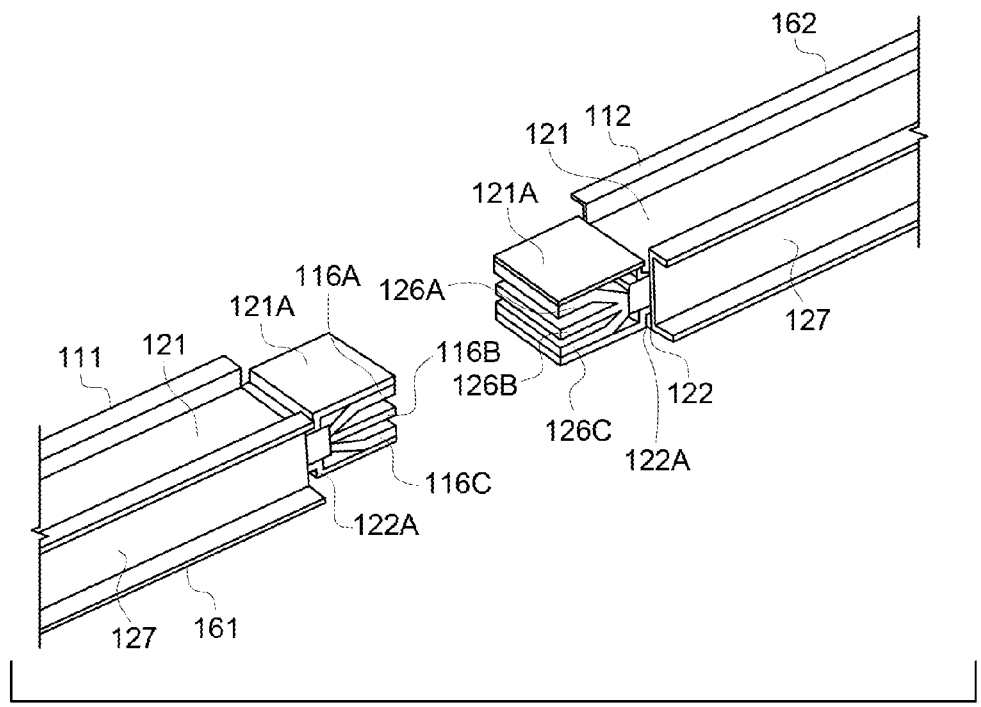
FIG. 2 is a perspective view of the busway system shown in FIG. 1 with the busway joint removed for clarity.

In the example embodiment, as shown in FIG. 2, first busway section 111 includes an elongate busway housing 161 and a plurality of runs of generally flat elongate busbars 116A, 116B, and 116C positioned within busway housing 161. In this embodiment, each of busbars 116A-116C are associated with a specific electrical phase of an electrical distribution system, and are configured for operable connection with a corresponding phase, ground, or neutral bus within the electrical distribution system. In other embodiments, each of busbars 116A-116C may include a plurality of electrically coupled busbars, each set being associated with a specific electrical phase, ground, or neutral of the electrical distribution system.

Similarly, in this embodiment, second busway section 112 includes an elongate housing 162 and a plurality of runs of generally flat elongate busbars 126A, 126B, and 126C, positioned within housing 162. Each of busbars 126A-126C are associated with a specific electrical phase of an electrical distribution system, and are configured for operable connection with a corresponding phase, ground, or neutral bus within the electrical distribution system. In other embodiments, each of busbars 126A-126C may include a plurality of electrically coupled busbars, each set being associated with a specific electrical phase, ground, or neutral of the electrical distribution system.

While first and second busway sections 111, 112 are shown in the figures and discussed herein as each including three busbars, it should be understood that other embodiments are not so limited and first and second busway sections 111, 112 may each include any desired number of busbars and any desired number of busbars per electrical phase, ground, or neutral that enables busway system 110 to function as described herein.

As illustrated in FIG. 2, in the example embodiment, busway section housing 161 includes a busway top cover 121 and a busway bottom cover 122 that cooperate with a pair of opposing busway side covers 127. In some embodiments, busway housing top and bottom covers 121, 122 may each include a respective busway top and bottom cover transition portion 121A, 122A. Respective busway top and bottom cover transition portions 121A, 122A are configured to cooperate with a housing 163 of busway joint 113. Busway housing 161 may be formed of rigid non-ferrous material such as aluminum. When operatively installed, busway top cover 121 and busway bottom cover 122 are configured to be fixedly coupled with a respective top surface 123 and a bottom surface (not shown) of busway joint 113. In various embodiments, top cover 121 and bottom cover 122 may be fixedly coupled with respective top surface 123 and the bottom surface of busway joint 113 via any means, such as fastening, riveting strapping, bolting, gluing, and the like that enables the busway system to function as described herein. For example, each busway housing 161, 162, top cover 121, and bottom cover 122 may be fixedly coupled to respective busway joint top surface 123 and the bottom surface with a fastener such as a bolt (not shown). Busway housings 161, 162 are arranged to prevent ingress of dust and contaminants into an interior of respective busway sections 111, 112 and to operably prevent inadvertent contact with electrically live busbars 116A-116C, 126A-126C by a user. Busway housing 162 may be identical to busway housing 161. Busway housing side covers 127 may be fixedly coupled to respective busway top cover 121 and bottom cover 122 via any means, such as fastening, riveting strapping, bolting, gluing, and the like that enables the busway system to function as described herein. For example, busway side covers 127 may be fixedly coupled to respective busway top cover 121 and bottom cover 122 with a fastener such as a bolt (not shown).

With reference to FIGS. 3-9, an example busway joint 200 for use in a busway system such as busway system 110 (shown in FIG. 1) is described. In the example embodiment, busway joint 200 includes a pair of opposed movable assemblies 210, 211 (i.e., housing 163), a plurality of electrically conductive busbars 230, and one or more braces 250. Adjusting movable assemblies 210, 211 enables busway joint 200 to couple busway sections 111, 112 over a range of different offset distances. Busbars 230 are separated into a plurality of phases. Busbars 230 in different phases are mutually isolated from each other. Each busbar 230 may not be insulated from other busbars 230 within the same phase. In other embodiments, busway joint 200 may include additional, fewer, or alternative components to couple busway sections 111, 112. Although busway joint is shown as a longitudinally extending joint, busway joint 200 may have a different configuration (e.g., an elbow joint, an angle joint, etc.).

Movable assemblies 210, 211 include a plurality of electrically conductive splice plates 212, a plurality of insulation laminations 214, one or more insulative spacers 216, and a cover 218. Each movable assembly 210, 211 is electrically coupled to a busway section (e.g., busway sections 111, 112, shown in FIG. 1) and busbars 230. Movable assemblies 210, 211 are slidably coupled to busbars 230 to facilitate selectively adjusting the length of busway joint 200. In some embodiments, splice plates 212 and busbars 230 may be switched such that movable assemblies 210, 211 may be slidably coupled to splice plates 212. In the example embodiment, movable assemblies 210, 211 are adjustable between a collapsed position and an extended position. In the collapsed position, movable assemblies 210, 211 are prevented from moving towards one another. In the expanded position, movable assemblies 210, 211 are prevented from moving away from one another. In other embodiments, at least one of movable assemblies 210, 211 may be fixedly coupled to busbars 230.

Movable assemblies 210, 211 are configured to extend to a predetermined position (i.e., to couple the busway sections together) between the extended and the collapsed positions. Movable assemblies 210, 211 are further configured to maintain the predetermined position. In at least some embodiments, movable assemblies 210, 211 are configured to move symmetrically (i.e., as movable assembly 210 moves, movable assembly 211 moves a substantially equal and opposite distance). In other embodiments, movable assemblies 210, 211 are configured to move asymmetrically or independent of one another.

Splice plates 212 are configured to electrically couple to busbars 230 and the busway sections. Although in electrical communication, splice plates 212 and busbars 230 are separate components vertically and/or horizontally offset from each other to facilitate length adjustment of busway joint 200. Splice plates 212 are made of an electrically conductive material or combination of materials, such as aluminum or copper. In the example embodiment, each busbar 230 is disposed between two vertically stacked elongated splice plates 212 as described herein. For example, busway joint 200 includes three busbars 230, and busway joint 200 includes six splice plates 212 such that each busbar 230 is interleaved between two splice plates 212. In other embodiments, splice plates 212 may be in a different configuration.

In the example embodiment, insulation laminations 214 are elongated laminations spaced apart to receive busbars 230 and splice plates 212. Insulation laminations 214 are configured to prevent electrical current from traveling between adjacent busbars 230 within movable assemblies 210, 211. Electrical current traveling between busbars 230 may cause a short circuit event (e.g., voltage and current spikes) that may cause damage to the busway system and systems coupled to the busway system.

In the example embodiment, spacers 216 are positioned adjacent to splice plates 212 and busbars 230 to provide additional insulation and structural support to movable assemblies 210, 211. Spacers 216 are formed from a rigid insulative material. In at least some embodiments, spacers 216 include grooves, slots, or other features to receive splice plates 212 and busbars 230. Spacers 216 may also include apertures or threaded holes configured to receive fasteners or other retaining members.

Cover 218 is configured to at least partially cover movable assemblies 210, 211. Cover 218 is configured to prevent ingress of dust and contaminants (e.g., water) into an interior of movable assemblies 210, 211, and to prevent inadvertent contact by a user with the conductors therein. In at least some embodiments, cover 218 may be configured to provide an electrical grounding connection. In one embodiment, cover 218 is formed of a rigid non-ferrous material such as aluminum.

Figure 4:
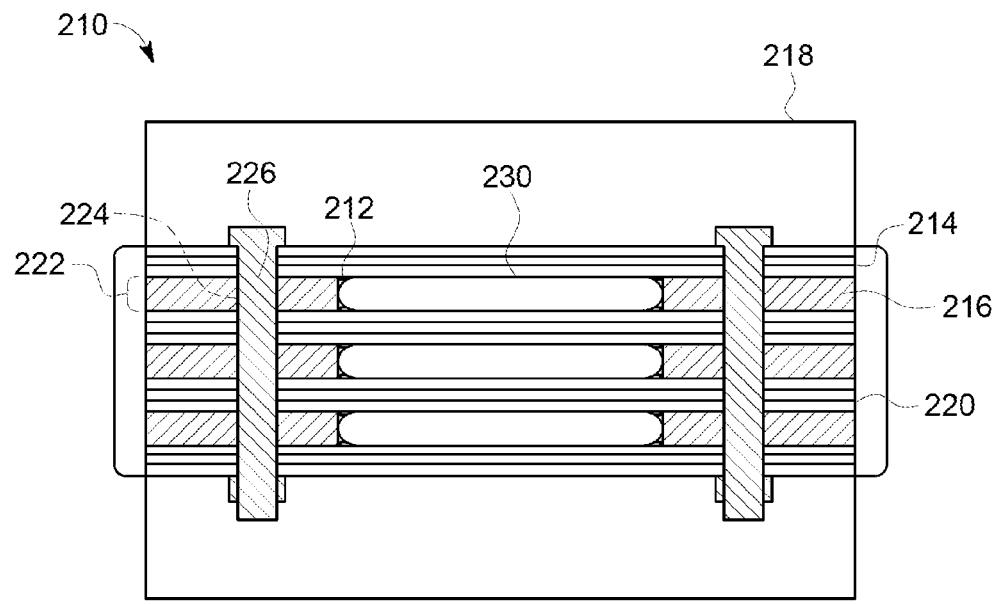
FIG. 4 is a cross sectional view of an example movable assembly of the busway joint shown in FIG. 3.
Figure 5:
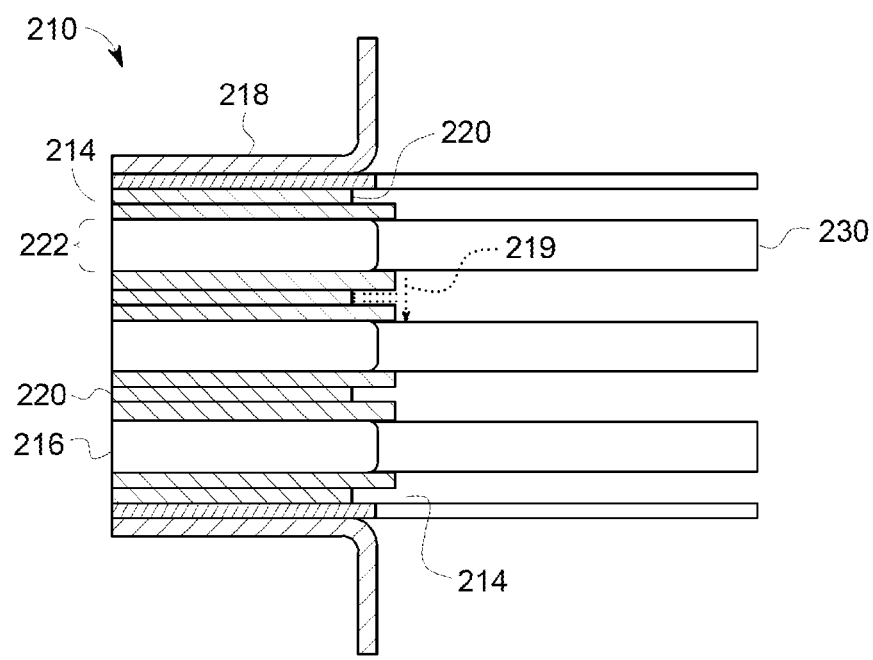
FIG. 5 is a partial side plan view of an example movable assembly and a plurality of busbars of the busway joint shown in FIG. 3.

FIG. 4 is a cross sectional view of movable assembly 210. In at least some embodiments, insulation laminations 214 include one or more insulative sheets 220 stacked together. In the illustrated embodiment, each insulation lamination 214 includes two or three insulation sheets 220. In other embodiments, insulation laminations 214 may include a different number of insulation sheets 220. With reference now to FIG. 5, insulation sheets 220 may be offset to extend a creepage path 219 between adjacent busbars 230. Extending the creepage path 219 facilitates increased resistivity between busbars 230 to prevent short circuit events.

Insulation laminations 214 are spaced apart to define a plurality of gaps 222. Gaps 222 are sized to fit splice plates 212, spacers 216, and busbars 230. In the example embodiment, the width of each gap 222 is substantially filled by splice plates 212, spacers 216, and busbars 230. A pair of opposed spacers 216 are positioned substantially adjacent to each busbar 230. Filling gaps 222 prevents contaminants from affecting busbars 230 and busbar 230 from moving within gaps 222.

In the example embodiment, spacers 216 include one or more apertures 224 for receiving bracing fasteners 226. Bracing fasteners 226 may include, for example, screws, bolts, pins, or a different type of fastener. Bracing fasteners 226 may be a conductive material (e.g., a metal) or an insulated material (e.g. rubber or plastic). Bracing fasteners 226 are configured to clamp splice plates 212, insulative laminations 214, spacers 216, and busbars 230 together within movable assemblies 210, 211. Attaching bracing fasteners 226 through spacers 216 and not busbars 230 enables busway joint 200 to be mechanically supported by movable assemblies 210, 211. In addition, attaching bracing fasteners 226 through spacers 216 facilitates improved thermal dissipation within busbars 230.

In the example embodiment, bracing fasteners 226 are further configured to selectively apply a compressive force inwardly towards a top and/or a bottom insulation lamination 214 to clamp splice plates 212 and busbars 230 together. Alternatively, spacers 216 may have a height greater than the combined height of spliace plates 212 and busbars 230. In such an embodiment, bracing fasteners 226 may apply the compressive force while facilitating longitudinal adjustment of busway joint 200. The compressive force may also be applied to cover 218. The compressive force may prevent movable assemblies 210, 211 from moving with respect to busbars 230. In certain embodiments, fasteners 226 may be configured to adjust the compressive force. For example, fasteners 226 may be rotated to adjust the compressive force. In some embodiments, fasteners 226 may be adjusted to remove the compressive force. Removing or substantially reducing the compressive force may enable movable assemblies 210, 211 to move with respect to busbars 230. In one example, busway joint 200 is installed by adjusting movable assemblies 210, 211 to couple between busway sections and subsequently tightening bracing fasteners 226 to secure busway joint 200 in place.

Figure 6:
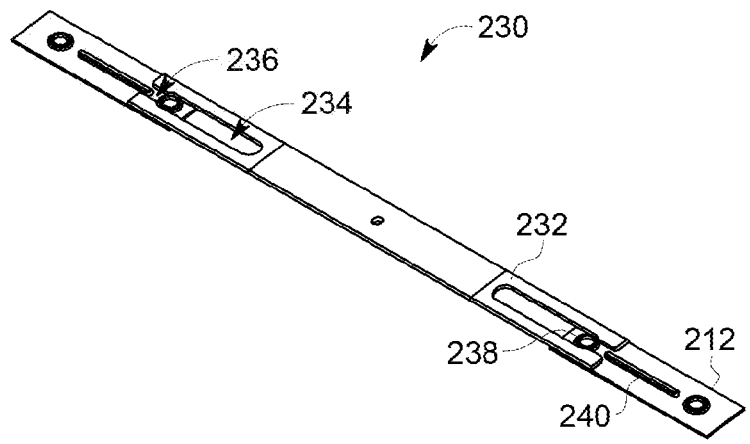
FIG. 6 is a perspective view of an example busbar that may be used with the busway joint shown in FIG. 3.

FIG. 6 is a perspective view of an example busbar 230. Busbar 230 is formed from an electrically conductive material such as copper or aluminum. Busbar 230 is configured to facilitate electrically coupling two busway sections together. Each busbar 230 in a busway joint (e.g., busway joint 200 shown in FIG. 3) may be associated with a different power phase. In some embodiments, busbar 230 may include a coating such as epoxy to maintain electrical clearance between each phase of busbars 230 and ground. In some embodiments, busbar 230 may include an insulative or protective coating such as rubber to prevent an operator from contacting busbar 230. Additionally or alternatively, busbar 230 may include a conductive coating (e.g., plating) for facilitating electrical transmission between busbar 230 and splice plate 212.

In the example embodiment, busbar 230 includes a pair of opposed fork bars 232 coupled to splice plates 212. Fork bars 232 are electrically conductive to transfer current from busbar 230 to splice plates 212. Although not shown in FIG.

6, another splice plate 212 is coupled to each fork bar 232 such that forks bars 232 are positioned between splice plates 212. In one embodiment, fork bars 232 are integrally formed with busbar 230. In other embodiments, fork bars 232 are coupled to busbar 230. Although referred to as "fork bar 232", is it to be understood that fork bar 232 may also include different configurations other than the illustrated embodiment with a pair of extending members and two open channels between the members. For example, fork bar 232 may include a closed channel coupled to splice plates 212.

Figure 7:
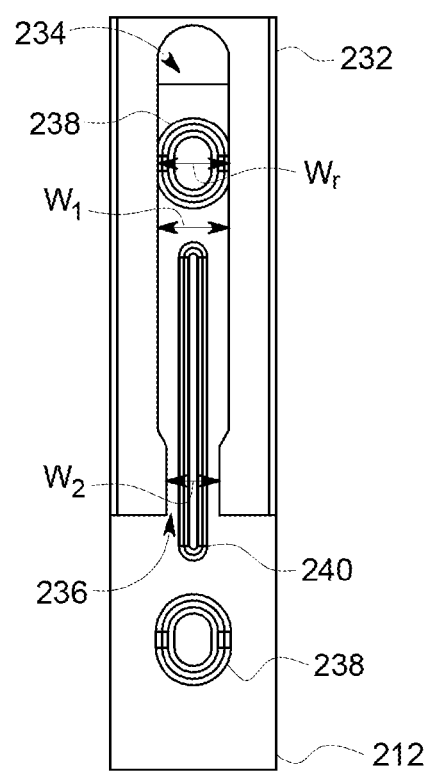
FIG. 7 is a top plan view of an example splice plate and fork bar that may be used with the busway joint shown in FIG. 3.

Fork bars 232 are slidably coupled to splice plates 212 to permit movable assemblies (e.g., movable assemblies 210, 211 shown in FIG. 3) coupled to splice plates 212 to move longitudinally. FIG. 7 is a top plan view of a fork bar 232 and a splice plate 212. In the illustrated embodiment, fork bar 232 includes a first channel 234 and a second channel 236 narrower than first channel 234. In other embodiments, fork bar 232 may include a different number of channels or a different configuration of channels. Splice plate 212 includes one or more retaining structures 238. In the example embodiment, retaining structures 238 are raised structures configured to limit the movement of splice plate 212 relative to busbar 230. In the illustrated embodiment, splice plate 212 includes one retaining structure 238 positioned within first channel 234 and another retaining structure 238 positioned external of first and second channels 234, 236. First channel 234, second channel 236, and retaining structure 238 are sized such that retaining structure 238 is movable within first channel 234 but cannot pass through second channel 236. Second channel 236 is configured to limit the movement of the movable assemblies to a length of first channel 234.

In the illustrated embodiment, first channel 234 has a width $W_1$ greater than a width $W_r$ of retaining structure 238 while second channel 236 has a width $W_2$ less than width $W_r$ of retaining structure 238. As splice plate 212 moves outwardly from busbar 230, retaining structure 238 within first channel 234 engages fork bar 232 at second channel to prevent further outward movement of splice plate 212. Similarly, moving splice plate 212 inwards towards busbar 230 causes retaining structure 238 external of channels 234, 236 to engage fork bar 232 at second channel 236 to prevent further inward movement. Additionally or alternatively, retaining structure 238 within first channel 234 may engage fork bar 232 at an end opposite of second channel 236 to limit movement.

In the example embodiment, splice plate 212 further includes a rib 240 that extends longitudinally on splice plate 212. Rib 240 is configured to pass through first and second channels 234, 236. Rib 240, when connecting a rib 240 from another splice plate 212, enables splice plate 212 to transfer and distribute a compressive force, such as the compressive force provided by bracing fasteners 226 shown in FIG. 5. If the compressive force is not distributed, components impacted by the compressive force may be damaged.

Figure 8:
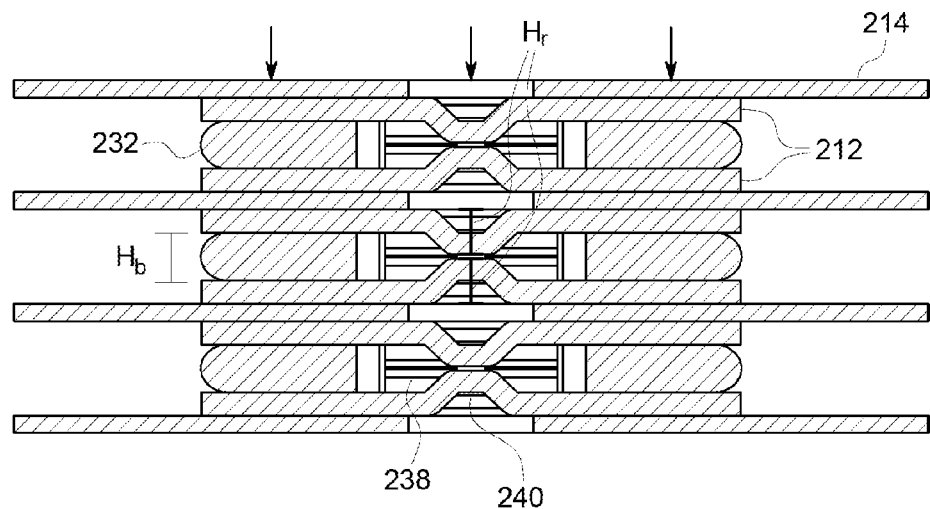
FIG. 8 is a cross sectional view of example splice plates and fork bars that may be used with the busway joint shown in FIG. 3.
Figure 9:
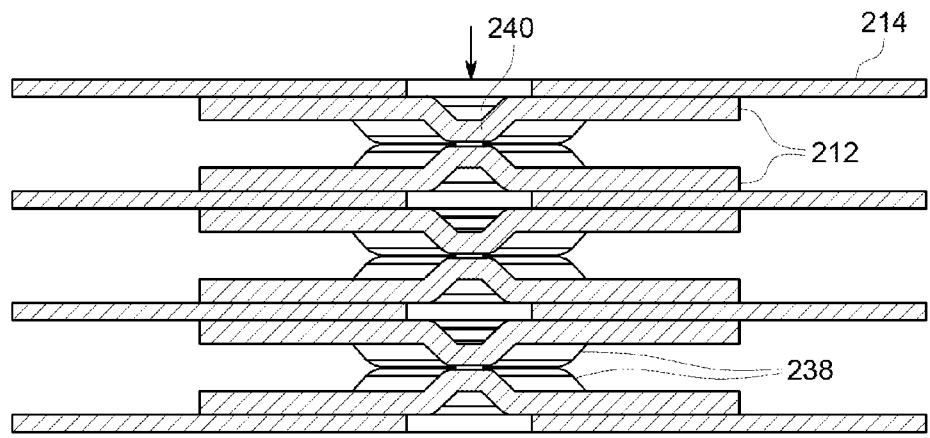
FIG. 9 is a cross sectional view of example splice plates of a busway joint, such as the busway joint shown in FIG. 3.

FIGS. 8 and 9 are cross sectional views of splice plates 212 when a compressive force is applied. As shown in FIG. 8, when fork bars 232 are positioned within splice plates 212, the force is distributed and transferred through fork bars 232. In the example embodiment, spacers (e.g., spacers 216, shown in FIG. 3) adjacent to fork bars 232 also transfer the compressive force. When fork bars 232 have moved away from rib 240 as shown in FIG. 9, the pair of ribs 240 is configured to transfer the compressive force. In the example embodiment, each rib 240 has a height $H_r$ approximately half of a height $H_b$ of fork bars 232 such that pairs of ribs 240 contact each other.

Figure 3:
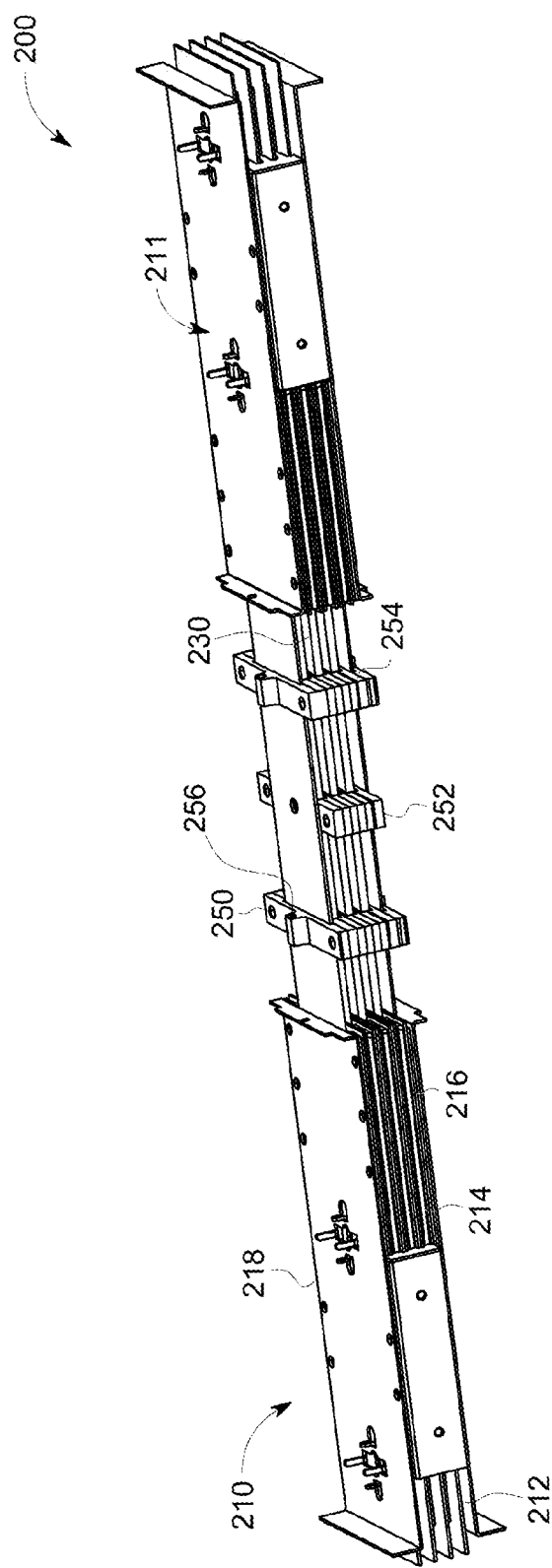
FIG. 3 is a perspective view of an example busway joint that may be used with the system shown in FIG. 1.

With reference again to FIG. 3, braces 250 are configured to support busbars 230 while maintaining separation between adjacent busbars 230 to prevent short circuit events and damage to busway joint 200 if a short circuit event occurs. In some embodiments, braces 250 are formed from a metal such as iron, aluminum, or steel. Additionally or alternatively, braces 250 may be formed using an insulative material such as plastic or rubber. Although three braces 250 are shown in FIG. 3, it is to be understood that busway joint 200 may include a different number of braces 250 (including one).

Braces 250 are slidably coupled to busbars 230 to enable braces 250 to move based on movable assemblies 210, 211. In at least some embodiments, braces 250 include one or more stationary braces 252 that are fixedly coupled to busbars 230. In the example embodiment, each brace 250 includes a plurality of laminations 254 to support and separate busbars 230. In other embodiments, braces 250 do not include laminations 254 and implement a different configuration to couple to busbars 230, such as integrated slots (not shown). In the illustrated embodiment, each busbar 230 is disposed between two laminations 254. Braces 250 may be secured around busbars 230 using one or more fasteners (e.g., bolts, screws, pins, etc.). Alternatively, braces 250 may be secured around busbars 230 using a different technique or component.

In the example embodiment, when movable assemblies 210, 211 are moved outward with respect to busway joint 200, braces 250 (with the exception of stationary brace 252) move outwardly to support busbars 230. Braces 250 may spread apart up from each other and movable assemblies 210, 211 up to a predetermined distance or interval. To prevent braces 250 from spreading apart beyond the predetermined interval, busway joint 200 may include one or more brace locators (not shown in FIG. 3) that self-adjust braces 250. The brace locator is configured to position braces 250 at the predetermined interval until movable assemblies 210, 211 are moved inwardly. In one embodiment, the brace locator positions braces 250 at the predetermined interval when movable assemblies 210, 211 are in the expanded position. In the example embodiment, movable braces 250 include a slot 256 to receive a brace locator. In some embodiments, the brace locator is a rigid member such as, for example, a rod, bracket, or a plate. Alternatively, the brace locator may be a flexible member such as a spring or another flexible material. The flexible member is configured to bias braces 250 within the predetermined interval.

In certain embodiments, the brace locator is coupled to movable assemblies 210, 211. Additionally or alternatively, the brace locator may be coupled to stationary brace 252. The brace locator may be coupled to multiple braces 250. For example, the brace locator may be configured to telescope with each coupled brace 250.

Figure 10:
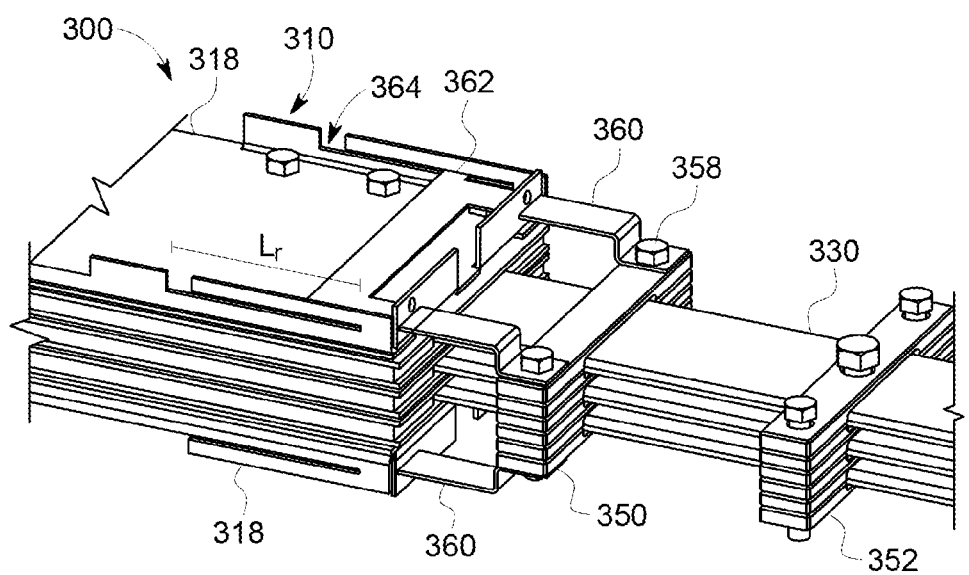
FIG. 10 is a partial perspective view of another example busway joint.
Figure 11:
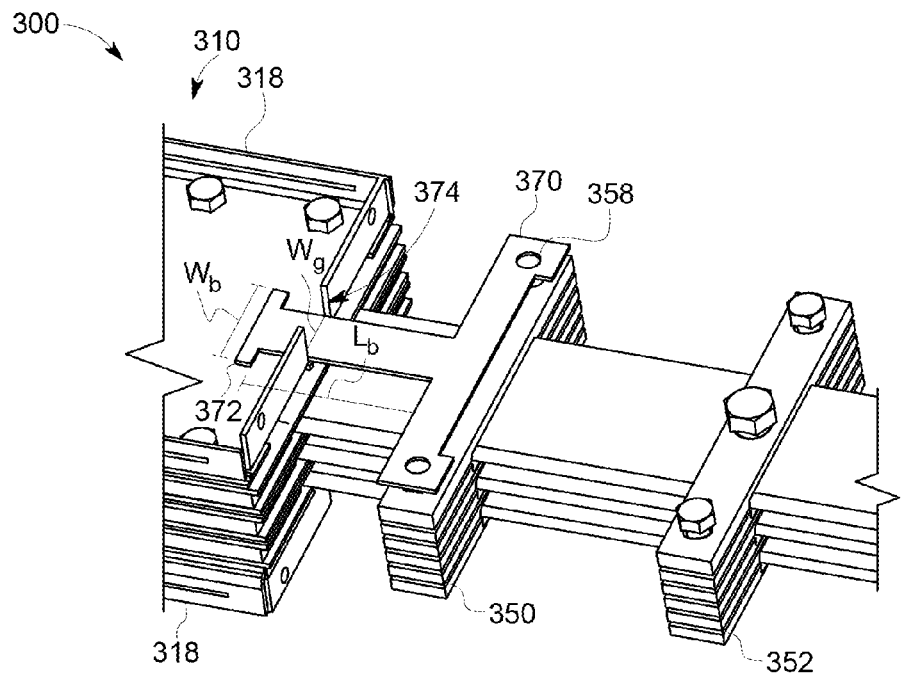
FIG. 11 is a partial perspective view of another example busway joint.
Figure 12:
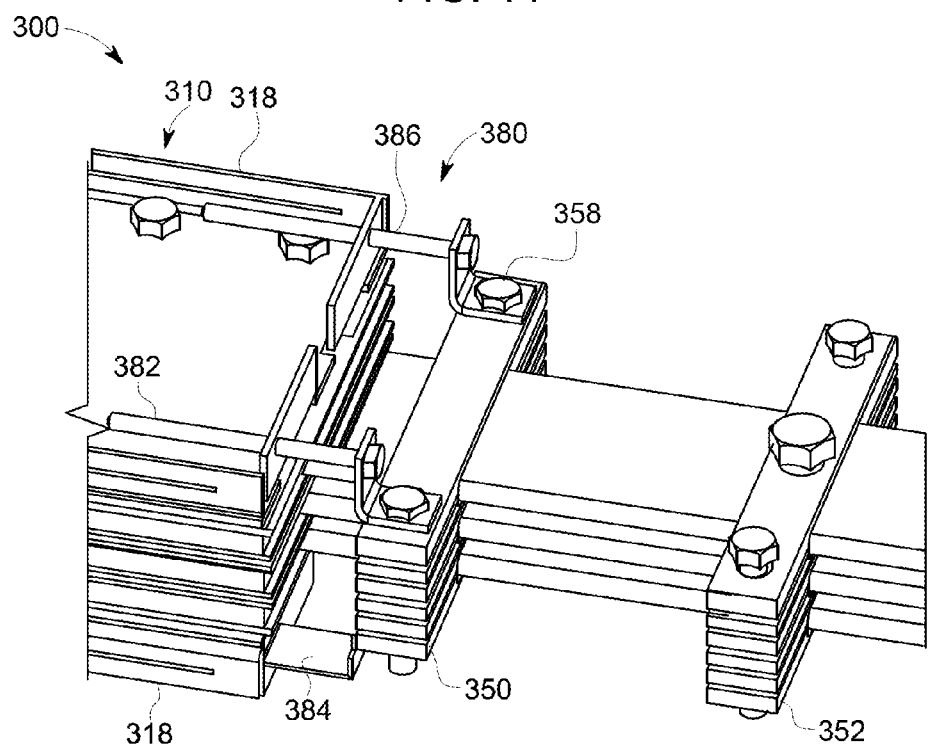
FIG. 12 is a partial perspective view of another example busway joint.

FIGS. 10-12 illustrate a partial perspective view of another example busway joint 300 with different brace locator configurations. Busway joint 300 is similar to busway joint 200 (shown in FIG. 3) and, in the absence of contrary representation, includes similar components. Busway joint 300 includes a movable assembly 310, conductors 330, a movable brace 350, and a stationary brace 352. Movable assembly 310 includes a cover 318. In the example embodiment, brace 350 includes a pair of fasteners 358. In other embodiments, brace 350 may include a different number of fasteners 358.

With reference to FIG. 10, busway joint 300 includes an example brace locator 360 coupled to cover 318 and fasteners 358 of brace 350. Brace locator 360 includes a pair of brackets that couple to the top and bottom of fasteners 358. Brace locator 360 includes tabs 362 that are positioned within a corresponding channel 364 of cover 318. As movable assembly 310 moves outward, tabs 362 slide through channel 364 until tabs 362 engage cover 318 at the end of channel 364. Brace 350 is configured to move with brace locator 360. In the example embodiment, the distance between movable assembly 310 and brace 350 is limited by a length $L_c$ of channel 364. Once tabs 362 engage cover 318, brace 350 may continue to extend outward with movable assembly 310, but brace locator 360 is configured to prevent the distance between movable assembly 310 and brace 350 from increasing.

Busway joint 300 shown in FIG. 11 includes another example brace locator 370. In the illustrated embodiment, brace locator 370 is a slidable T-shaped bracket that includes tabs 372. Cover 318 includes a gap 374. Brace locator 370 is positioned within gap 374. In the example embodiment, tabs 372 have a width $W_b$ that is greater than a width $W_g$ such that tabs 372 are prevented from passing through gap 374. Tabs 372 engage cover 318 to prevent the distance between movable assembly 310 and brace 350 from increasing. In the example embodiment, the distance between movable assembly 310 and brace 350 is limited based on a length $L_b$ of brace locator 370.

Busway joint 300 shown in FIG. 12 includes another example brace locator 380. Brace locator 380 includes a pair of slidable rods 382 coupled to brackets that are attached to fasteners 358. In some embodiments, rods 382 include a stopping member (not shown) configured to engage cover 318 and prevent further movement of brace 350 relative to movable assembly 310. The stopping member may include, for example, a bolt, a nut, a washer, an insert, a spring, a flexible component, or a bracket. The stopping member may be coupled to rods 382 or integrally formed. In the example embodiment, brace locator 380 includes a bracket 384 similar to brace locator 360 shown in FIG. 10 to prevent the distance between movable assembly 310 and brace 350 from increasing. Rods 382, with or without a stopping member, are configured to linearly guide busway joint 300 as movable assembly 310 is extended or contracted. In some embodiments, rods 382 may telescope to extend the length of rods 382.

In the example embodiment, cover 318 includes a pair of slots 386. Rods 382 are slidably coupled to cover 318 through slots 386. In some embodiments, slots 386 have a diameter greater than an outer diameter of rods 382 but smaller than a diameter of a stopping member. In such embodiments, the distance between movable assembly 310 and brace 350 may be limited to a length between the stopping member and brace 350.

Although FIGS. 10-12 illustrate busway joint 300 with brace 350 coupled to cover 318 and stationary brace 352 positioned adjacent to brace 350, it is to be understood that brace locators may be used in different configurations. For example, the brace locator may be coupled to stationary brace 352 or a second brace 350 to prevent a distance between a first brace 350 and stationary brace 352 or a second brace 350 from increasing. In another example, busway joint 300 may include a different configuration for cover 318 and the brace locator that limits the distance between movable assembly 310 and brace 350. In yet another example, the brace locator may be coupled to a plurality of adjacent braces 350. In the example, the brace locator may be configured to limits the distance between each brace 350.

Figure 13:
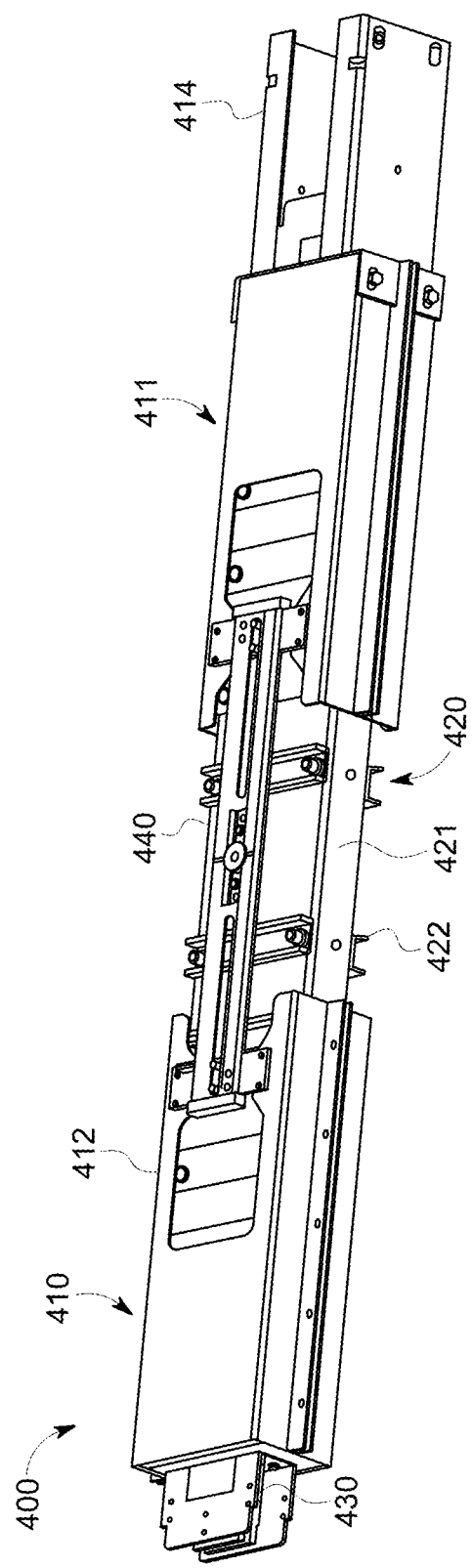
FIG. 13 is a perspective view of an example busway joint that may be used in the busway system shown in FIG. 1.

FIG. 13 illustrates a top perspective view another example busway joint 400 for use in a busway system, such as busway system 110 shown in FIG. 1. Busway joint 400 is similar to busway joint 200 (shown in FIG. 3) and, in the absence of contrary representation, includes similar components. In the example embodiment, busway joint 400 includes a pair of opposed movable assemblies 410, 411, a stationary assembly 420, a plurality of busbars 430, and an adjustment assembly 440. In other embodiments, busway joint 400 may include additional, fewer, or alternative components to electrically couple busway sections, include those described elsewhere herein.

Busway joint 400 is configured to selectively adjust its length to couple to at least two spaced apart busway sections. Selectively adjusting the length of busway joint 400 facilitates use of busway joint 400 for different distances between busway sections. Although busway joint 400 is shown as a longitudinally extending joint, busway joint 400 may have a different configuration (e.g., an elbow joint, an angle joint, etc.).

Movable assemblies 410, 411 are configured to move to adjust the length of busway joint 400. In the example embodiment, movable assemblies 410, 411 are coupled to busbars 430. Each busbar 430 is divided, for example, in half for each phase such that one portion of busbar 430 moves with movable assembly 410 and another portion of busbar 430 moves with movable assembly 411.

Movable assemblies 410, 411 include a cover 412 to support busbars 430. In the example embodiment, covers 412 substantially surround a portion of busbars 430. Covers 412 are configured to prevent contaminants from affecting the interior of movable assemblies 410, 411. In the illustrated embodiment, movable assembly 411 further includes a guard 414 coupled to cover 412 for protecting and maintaining an interface between busway joint 400 and a busway section.

Stationary assembly 420 is disposed between movable assemblies 410, 411. Movable assemblies 410, 411 surround stationary assembly 420. Stationary assembly 420 is configured to support and protect busbars 430 and splice plates (not shown in FIG. 13) within busway joint 400. In the example embodiment, stationary assembly 420 includes a pair of covers 421 coupled together around busbars 430 and the splice plates. Stationary assembly 420 includes a plurality of support structures 422 to couple covers 421 together. Each support structure 422 includes one or more fasteners that extend through apertures (not shown) in stationary assembly 420 to another support structure 422. In other embodiments, stationary assembly 420 may include a different number and/or configuration of covers 421. For example, stationary assembly 420 may be integrally formed.

Adjustment assembly 440 is coupled to movable assemblies 410, 411. Although adjustment assembly 440 is shown in FIG. 13 coupled to one side of busway joint 400, adjustment assembly 440 may be in a different position. Additionally or alternatively, busway joint 400 may include a plurality of adjustment assemblies 440. For example, one adjustment assembly 440 may be configured to position movable assembly 410 and another adjustment assembly 440 may be configured to position movable assembly 411. Adjustment assembly 440 is configured to selectively extend or contract movable assemblies 410, 411 to a predetermined position to connect a pair of busway sections. In the illustrated embodiment, adjustment assembly 440 is coupled to cover 412 via a bracket. Adjustment assembly 440 may include, for example, a gear, a pinion, one or more gear racks, a lever, and/or other components that enable an operator to selectively extend or contract busway joint 400.

Figure 14:
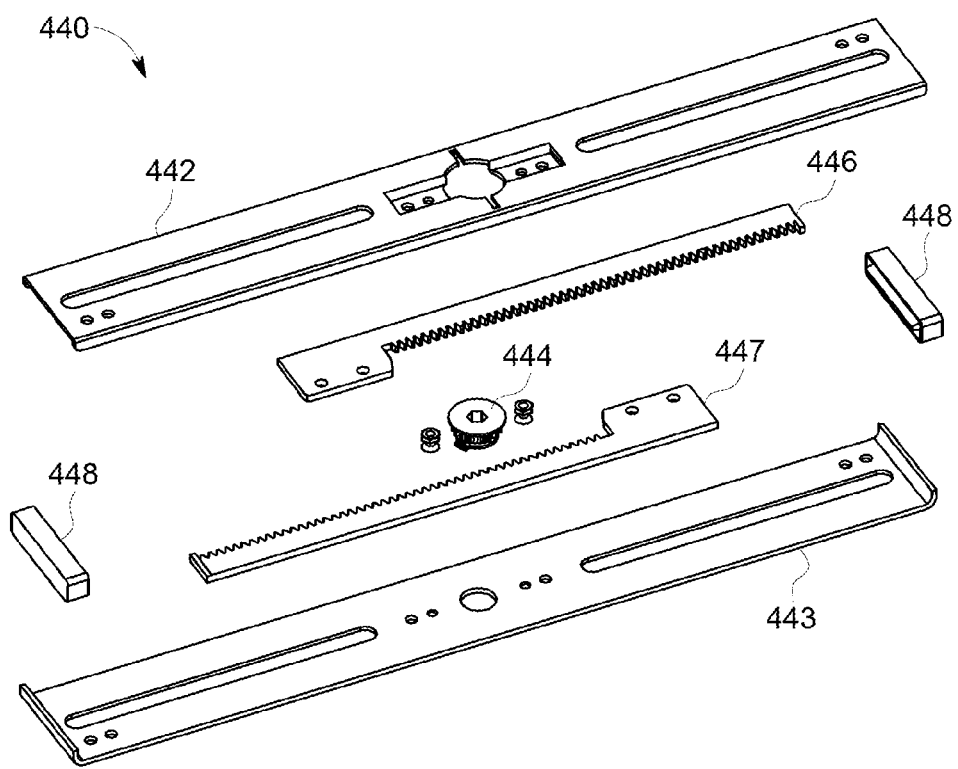
FIG. 14 is an exploded view of an example adjustment assembly that may be used with the busway joint shown in FIG. 13.

FIG. 14 depicts an exploded view of adjustment assembly 440. In the example embodiment, adjustment assembly 440 includes a pair of opposed covers 442, 443, a gear 444, a pair of opposed gear racks 446, 447, and a pair of caps 448. In other embodiments, adjustment assembly 440 may include additional, lesser, or alternative components for adjusting movable assemblies 410, 411 (shown in FIG. 13).

Covers 442, 443 are configured to protect gear 444 and gear racks 446, 447 from contaminants. Caps 448 are configured to secure covers 442, 443 together. Covers 442, 443 include apertures and channels for gear 444 and gear racks 446, 447. Gear 444 is operatively coupled to gear racks 446, 447. In the example embodiment, gear rack 446 is coupled to movable assembly 410 and gear rack 447 is coupled to movable assembly 411. In other embodiments, adjustment assembly 440 may include a scissor rack. Gear racks 446, 447 include apertures, fasteners, hooks, or other mating components to couple to movable assemblies 410, 411. Gear 444 is configured to selectively rotate. For example, an operator may rotate gear 444 with a tool. Rotating gear 444 causes gear racks 446, 447 (and movable assemblies 410, 411) to move longitudinally towards or away from each other. Covers 442, 443 include channels for each gear rack 446, 447 to limit the longitudinal movement. In particular, gear racks 446, 447 are limited between an expanded position and a collapsed position. In some embodiments, adjustment assembly 440 may include a shear pin or other component to limit gear racks 446, 447 to the expanded position.

In one example, when installing busway joint 400 (shown in FIG. 13) with adjustment assembly 440 in a busway system between two spaced apart busway sections, an operator rotates gear 444 to extend movable assemblies 410, 411 towards the busway sections. When movable assemblies 410, 411 are coupled to the busway sections, the operator secures busway joint 400 in position. In at least some embodiments, adjustment assembly 440 may include one or more locking pins, levers, or other components to prevent gear racks 446, 447 (and movable assemblies 410, 411) from moving.

Figure 15:
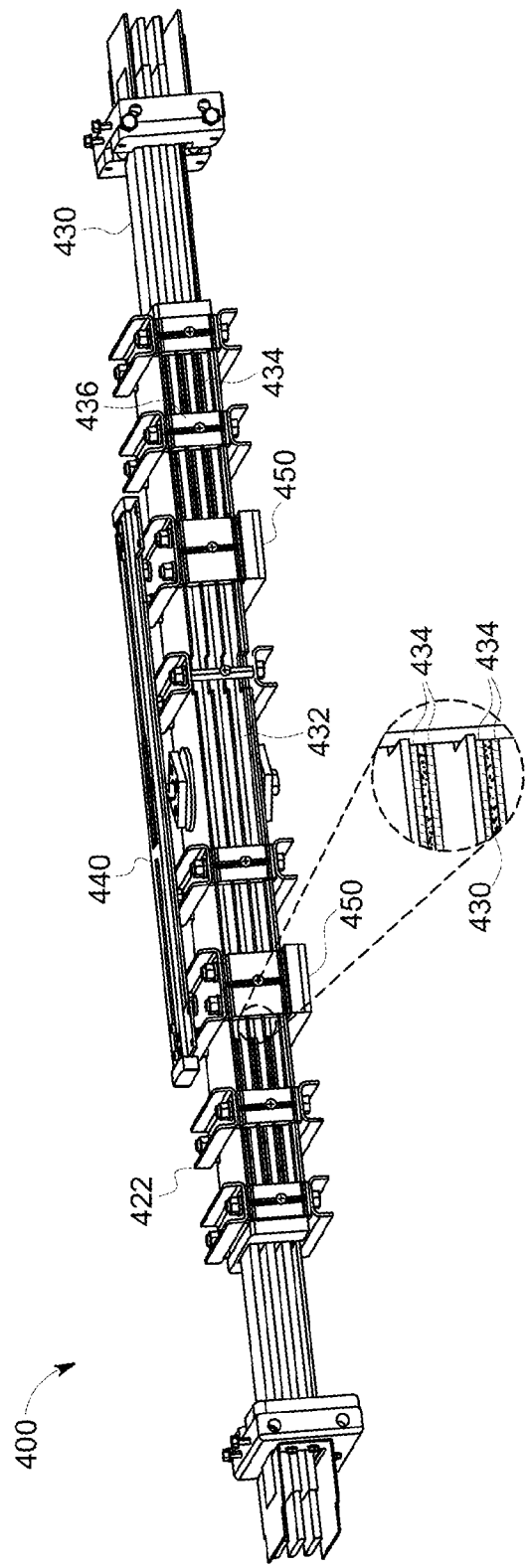
FIG. 15 is a side perspective view of the busway joint shown in FIG. 13 without the cover and the stationary assembly.

FIG. 15 illustrates a side perspective view of busway joint 400. Covers 412 and stationary assembly 420 have been removed for clarity. In the example embodiment, busway joint 400 includes a plurality of splice plates 432, insulation laminations 434, and insulative spacers 436.

Splice plates 432 extend through stationary assembly 420 and may extend through a portion of movable assemblies 410, 411. Splice plates 432, similar to splice plates 212 shown in FIG. 3, are electrically coupled to busbars 430. Splice plates 432 are configured to maintain electrical connection to busbars 430 even when busbars 430 have been extended with movable assemblies 410, 411. Splice plates 432 are vertically stacked with busbars 430 and insulation laminations 434. Insulation laminations 434 are configured to electrically isolate busbars 430 from each other to prevent short circuit events. In certain embodiments, splice plates 432 are configured to move with movable assemblies 410, 411. In such embodiments, busbars 430 may not move with movable assemblies 410, 411.

Spacers 436 are configured to space splice plates 432 apart to receive busbars 430 and insulation laminations 434. In the illustrated embodiment, supporting structures 422 include spacers 436. In the example embodiment, busway joint 400 also includes one or more vise braces 450 to selectively clamp busbars 430 and prevent movable assemblies 410, 411 from further movement. Vise braces 450 also include spacers 436. In the illustrated embodiment, busway joint 400 includes a pair of vise braces 450. In other embodiments, busway joint 400 may include a different number of vise braces, such as one, three, or four vise braces 450. Vise braces 450 are externally coupled to busbars 430 and splice plates 432. Vise braces 450 are adjustable to apply a compressive force on busbars 430, splice plates 432, insulation laminations 434, and/or spacers 436. In one example, when installing busway joint 400 in a busway system between two spaced apart busway sections, movable assemblies 410, 411 are adjusted to couple to the busway sections. Vise braces 450 are then adjusted to apply the compressive force and secure busway joint 400 in place.

Figure 16:
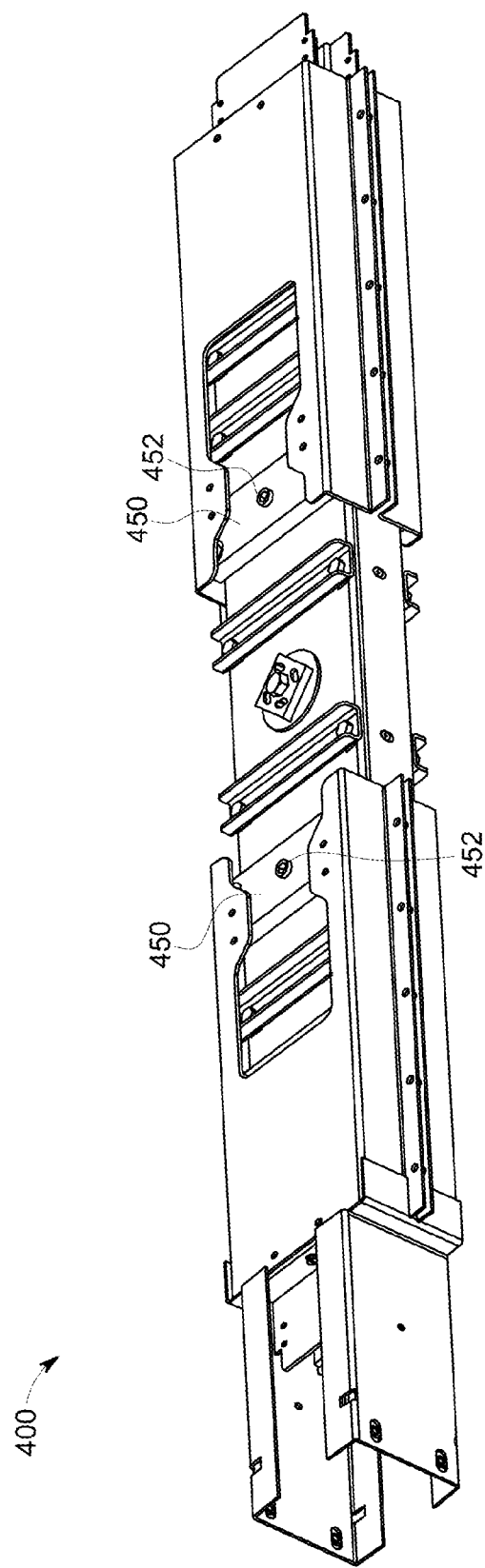
FIG. 16 is another perspective view of the busway joint shown in FIG. 13.
Figure 17:
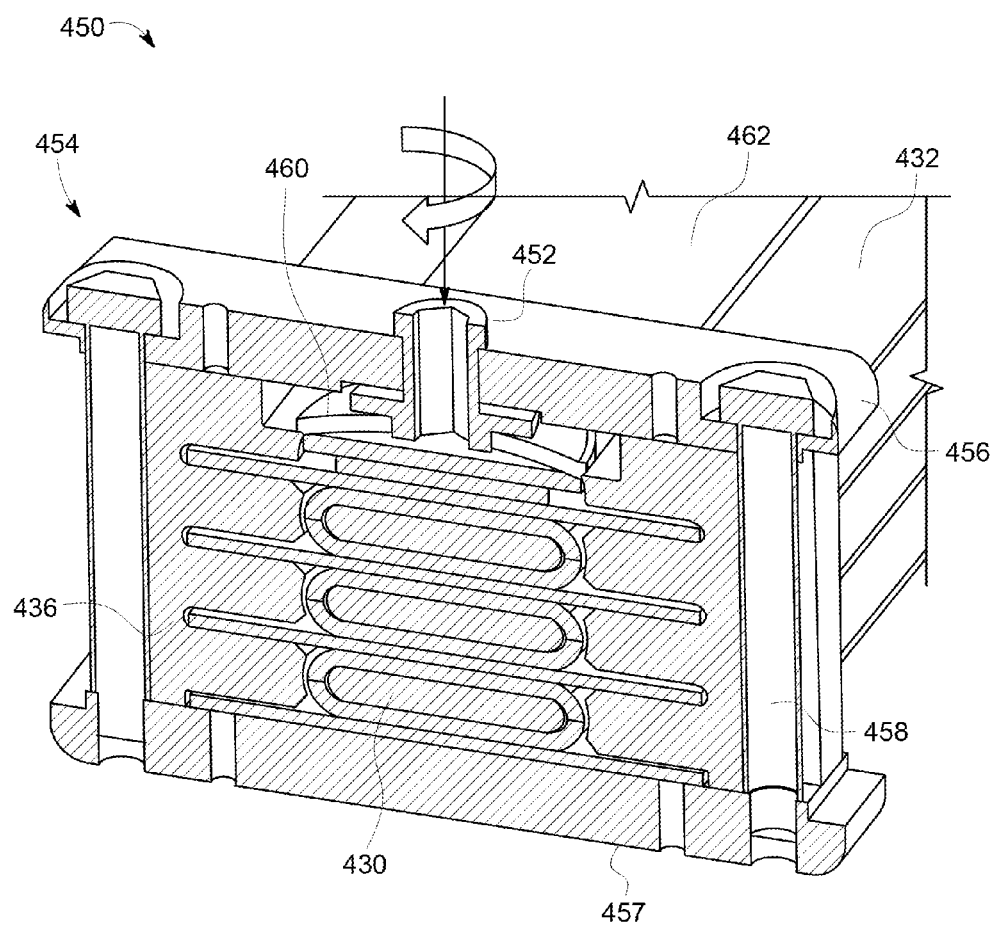
FIG. 17 is a perspective cross sectional view of an example vise brace that may be used with the busway joint shown in FIG. 13.

With reference to FIGS. 16 and 17, vise braces 450 are further described. FIG. 16 is a side perspective view of busway joint 400. FIG. 17 is a cross sectional perspective view of vise brace 450. In the example embodiment, vise brace 450 includes a clamp screw 452, a frame 454, one or more fasteners 458, and a compressive washer 460. In other embodiments, vise brace 450 may include additional, fewer, or alternative components to secure busbars 430 and splice plates 432 together.

In the example embodiment, clamp screw 452 is configured to selectively provide a compressive force to couple busbars 430 and splice plates 432 together. Clamp screw 452 is threaded such that rotating clamp screw 452 increases or decreases the compressive force. In the example embodiment, rotating clamp screw 452 clockwise increases the compressive force while rotating clamp screw 452 counterclockwise decreases the compressive force. Alternatively, rotating clamp screw 452 clockwise may decrease the compressive force and rotating clamp screw 452 counter-clockwise may increase the compressive force. In comparison, some known busway joints use a bolt that extends through the busbars and/or the splice plates to secure the busway joint. The bolt may reduce the cross sectional area of the busbars and the splice plates and create a dielectric gap between adjacent busbars. Current may travel across the dielectric gap and cause a short circuit event. In contrast, the compressive force provided by clamp screw 452 secures busway joint 400 without creating a dielectric gap between adjacent busbars 430.

Clamp screw 452 is externally accessible on busway joint 400 to enable an operator to adjust the compressive force. As shown in FIG. 16, clamp screw 452 is accessible on the opposite side of busway joint 400 from adjustment assembly 440 (shown in FIG. 13). Although vise brace 450 is shown with one centrally located clamp screw 452, vise brace 450 may include a different number of clamp screws 452 and/or clamp screws 452 in a different location.

Frame 454 includes a top brace 456 and a bottom brace 457 coupled together by fasteners 458. In the illustrated embodiment, fasteners 458 extend through spacers 436. Alternatively, fasteners 458 may extend around spacers 436 to couple braces 456, 457 together. Frame 454 is externally coupled around busbars 430 and splice plates 432. In the example embodiment, the compressive force is applied by clamp screw 452 towards bottom brace 457. Busbars 430 and splice plates 432 are compressed between clamp screw 452 and bottom brace 457. In other embodiments, the compressive force is applied towards top brace 456. In the example embodiment, fasteners 458 extend through spacers 436. In certain embodiments, fasteners 458 may provide a portion of the compressive force similar to bracing fasteners 226 (shown in FIG. 4). Fasteners 458 are configured to permit busbars 430 and/or splice plates 432 to move through vise brace 450 when clamp screw 452 is not providing the compressive force.

Compressive washer 460 is coupled between clamp screw 452 and busbars 430 to distribute the compressive force. In the illustrated embodiment, compressive washer 460 is a conical washer. Alternatively, compressive washer 460 may be a different shape. In the example embodiment, compressive washer 460 has a raised or curved surface. As clamp screw 452 is rotated and the compressive force is increased, the compressive force causes washer 460 to flatten and distribute the compressive force. In some embodiments, compressive washer 460 is integrally formed with clamp screw 452. In other embodiments, vise brace 450 does not include washer 460.

In the illustrated embodiment, busway joint further includes a compressive plate 462 that extends through each vise brace 450 along a length of busbars 430 and splice plates 432. Compressive plate 462 is configured to distribute a cumulative compressive force from vise braces 450.

The exemplary embodiments of an adjustable busway joint, a busway system, and a method of installing the adjustable busway joint are described above. The adjustable busway joint facilitates coupling busway sections at different offset distances without requiring a fixed-length busway joint at a specific offset distance. Slidably coupling busbars and splice plates within the busway joint enables the busway joint to extend longitudinally while maintain an electrical connection. Other features and components described in the exemplary embodiments facilitate longitudinal extension of the busway joints and securing the busway joint in a particular position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A busway system comprising:
   a first electrical busway section;
   a second electrical busway section, said first and said second electrical busway sections disposed longitudinally aligned with each other; and
   a busway joint coupling said first and said second busway sections, said busway joint comprising:
   a plurality of busbars;
   a plurality of splice plates coupled to said plurality of busbars, said plurality of splice plates and said plurality of busbars configured to electrically couple said first and said second electrical busway sections; and
   a vise brace surrounding said plurality of busbars and said plurality of splice plates, said vise brace comprising a clamp screw configured to selectively provide a compressive force to said plurality of busbars and said plurality of splice plates,
   wherein said vise brace further comprises at least one insulative spacer configured to separate said plurality of splice plates.

2. The busway system of claim 1, wherein said vise brace further comprises a frame including a top surface and a bottom surface, wherein the compressive force is further provided by at least one of said top surface and said bottom surface to clamp said plurality of busbars and said plurality of splice plates.

3. The busway system of claim 1, wherein said vise brace further comprises a compression device configured to distribute the compressive force.

4. The busway system of claim 3, wherein said compression device extends longitudinally along said plurality of busbars and said plurality of splice plates.

5. The busway system of claim 3, wherein said compression device comprises a compression washer.

6. The busway system of claim 1, wherein said clamp screw is configured to rotate to selectively adjust the compressive three.

7. The busway system of claim 1, wherein said vise brace further comprises a plurality of clamp screws configured to collectively provide the compressive force to said plurality of busbars and said plurality of splice plates.

8. The busway system of claim 1, wherein said busway joint further comprises a plurality of vise braces spaced apart at a predetermined interval along a length of said plurality of busbars and said plurality of splice plates.

9. The busway system of claim 8, wherein said busway joint further comprises a compression plate extending through each vise brace of said plurality of vise braces, said compression plate configured to distribute the compressive forces of said vise braces along the length of said plurality of busbars and said plurality of splice plates.

10. A busway joint coupling a first busway, section and a second busway section, said busway joint comprising:
    a plurality of busbars;
    a plurality of splice plates coupled to said plurality of busbars, said plurality of splice plates and said plurality of busbars configured to electrically couple the first and the second busway sections; and
    a vise brace externally coupled to said busbars and said splice plates, said vise brace comprising a clamp screw configured to selectively provide a compressive force to said plurality of busbars and said plurality of splice plates,
    wherein said vise brace further comprises at least one insulative spacer configured to separate said plurality of splice plates.

11. The bus way joint of claim 10, wherein said vise brace further comprises a frame including a top surface and a bottom surface, wherein the compressive force is further provided by at least one of said top surface and said bottom surface to clamp said plurality of busbars and said plurality of splice plates.

12. The busway joint of claim 10, wherein said vise brace further comprises a compression device configured to distribute the compressive force.

13. The busway joint of claim 12, wherein said compression device extends longitudinally along said plurality of busbars and said plurality of splice plates.

14. The busway joint of claim 12, wherein said compression device is a compression washer.

15. The busway joint of claim 10, wherein said clamp screw is configured to rotate to selectively adjust the compressive force.

16. The busway joint of claim 10, wherein said vise brace, further comprises a plurality of clamp screws configured to collectively provide the compressive force to said plurality of busbars and said plurality of splice plates.

* * * * *